US012350761B2

(12) United States Patent
Hargis

(10) Patent No.: US 12,350,761 B2
(45) Date of Patent: Jul. 8, 2025

(54) ON-SITE TRAILER AXLE MANUFACTURING JIG

(71) Applicant: Jeffrey Hal Hargis, Livonia, MI (US)

(72) Inventor: Jeffrey Hal Hargis, Livonia, MI (US)

( * ) Notice: Subject to any disclaimer, the term of this patent is extended or adjusted under 35 U.S.C. 154(b) by 0 days.

(21) Appl. No.: 18/210,451

(22) Filed: Jun. 15, 2023

(65) Prior Publication Data

US 2024/0416466 A1 Dec. 19, 2024

(51) Int. Cl.
*B23K 37/04* (2006.01)
*B23P 19/10* (2006.01)
*B60B 35/02* (2006.01)

(52) U.S. Cl.
CPC .......... *B23K 37/0426* (2013.01); *B23P 19/10* (2013.01); *B60B 35/02* (2013.01); *B60B 2310/302* (2013.01)

(58) Field of Classification Search
CPC ..... B23K 37/0426; B23P 19/10; B60B 35/02; B60B 2310/302
See application file for complete search history.

(56) References Cited

U.S. PATENT DOCUMENTS 2,440,696 A * 5/1948 Patterson ............. B23K 9/0325 219/124.22
4,082,935 A * 4/1978 Lampietti .............. B21D 53/30 228/151
4,892,993 A * 1/1990 Stol .................... B23K 37/0426 219/136
4,904,840 A * 2/1990 Fidelman ............... B23K 9/044 219/125.11
6,899,263 B2 * 5/2005 Tappan .................. B23K 9/048 228/49.1
2006/0163317 A1 * 7/2006 Wirth ..................... B23Q 1/527 228/32
2011/0253686 A1 * 10/2011 Keel ...................... B23K 26/08 29/401.1
2019/0143462 A1 * 5/2019 Simmons .................. E04B 1/14 269/153
2019/0247962 A1 * 8/2019 Boyd ................. B23K 37/0426

* cited by examiner

*Primary Examiner* — Seahee Hong
(74) *Attorney, Agent, or Firm* — Gregson IP Law, LLC

(57) ABSTRACT

A system providing an on-site trailer axle manufacturing jig according to the present invention includes a pair of jig horizontal members, a pair of end cross members coupled between the pair of jig horizontal members about opposing ends, a set of support leg members vertically arranged to support the combination of the jig horizontal members and the end cross members, a pair of attachment wheel assemblies adjustable coupled between the jig horizontal members, and an extending shaft coupled to one of the attachment wheel assemblies for receiving a set of balancing weights to act as a counterweight when manufacturing a trailer axle. Each of the support leg members is coupled to a corresponding leveling adjustment leg, and each attachment wheel assembly has an attachment wheel, a spindle chuck, and a wheel mount spindle. A trailer axle is assembled with a spindle inserted into each spindle chuck to align with opposing ends of an axle member during welding.

13 Claims, 17 Drawing Sheets

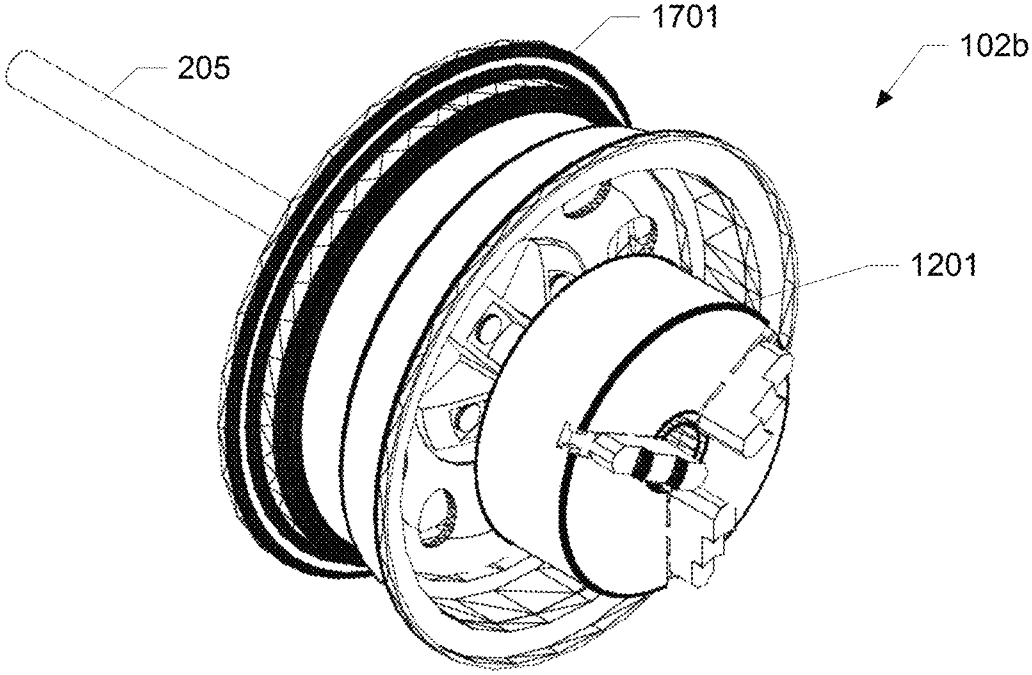
FIG. 17
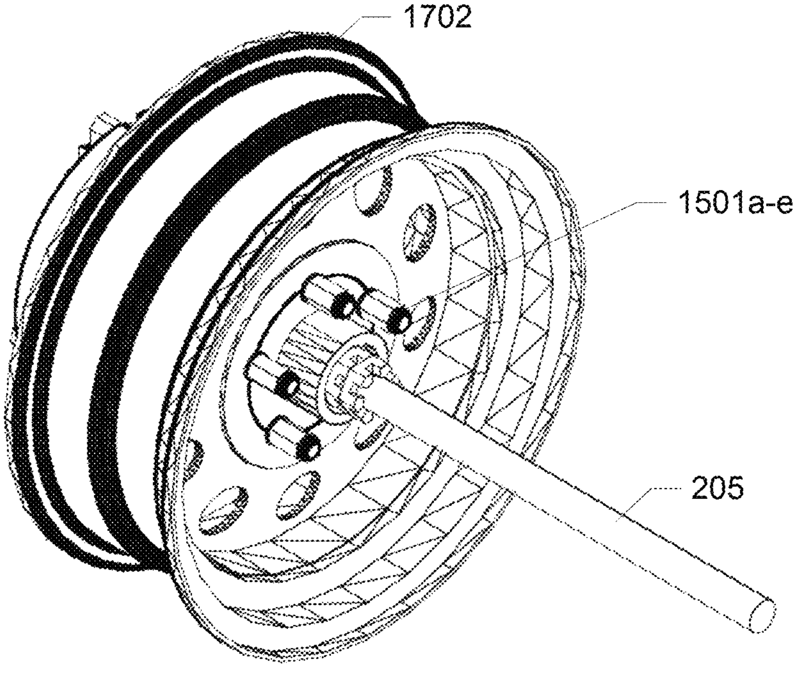

ON-SITE TRAILER AXLE MANUFACTURING JIG

TECHNICAL FIELD

This application relates in general to a system for providing trailer parts manufacturing, and more specifically, to a system providing an on-site trailer axle manufacturing jig.

BACKGROUND

Trailer repair and manufacture require the creation of an axle made using an axle member and a spindle at each end of the axle member. The spindles may be coupled directly to the axle member or may be coupled to angle drop brackets. Wheel hubs are attached to the spindle allowing for rotation of the hubs and attached wheel rims relative to the axle member.

In order to assemble an axle assembly, an axle member is cut to a desired length. The spindles, with or without the angle drop brackets, are coupled to the ends of the axle member. Typically, the spindles are welded to the opposite ends of the axle member. These welds are required to arrange and configure the rotation of the spindles and are preferably configured to rotate about a centerline of the axle member such that trailer wheels rotate about the centerline when a trailer is moved or towed on these wheels.

Currently, no easily transported axle support assembly exists that permits the alignment of these components into the desired configuration while permitting a user to weld these components to each other as the axle is being assembled. Typically, the axles are assembled at a manufacturing location using large and complex assemblies that align the components into a proper configuration. Once completed, the axle is transported to a location of a trailer body for installation.

Accurately measuring the length needed for the axle member that corresponds to the width of the corresponding trailer body can be challenging. If an axle is incorrectly sized, the manufactured axle needs to be re-assembled at a significant additional cost and lost time if the axle assembly is transported back to a manufacturing location, reassembled to a desired length, and returned again to the trailer body for installation. The likelihood of making such a sizing error may be reduced if the trailer assembly is constructed at the location of the corresponding trailer body.

Therefore, a need exists for a system providing an on-site trailer axle manufacturing jig. The present invention attempts to address the limitations and deficiencies in prior solutions according to the principles and example embodiments disclosed herein.

SUMMARY

In accordance with the present invention, the above and other problems are solved by providing a system for an on-site trailer axle manufacturing jig according to the principles and example embodiments disclosed herein.

In one embodiment, the present invention is a system providing an on-site trailer axle manufacturing jig. The trailer axle manufacturing jig includes a pair of jig horizontal members, a pair of end cross members coupled between the pair of jig horizontal members about opposing ends, a set of support leg members vertically arranged to support the combination of the jig horizontal members and the end cross members, a pair of attachment wheel assemblies adjustable coupled between the jig horizontal members, and an extending shaft coupled to one of the attachment wheel assemblies for receiving a set of balancing weights to act as a counterweight when manufacturing a trailer axle. Each of the support leg members is coupled to a corresponding leveling adjustment leg, and each attachment wheel assembly has an attachment wheel, a spindle chuck, and a wheel mount spindle. A trailer axle is assembled with a spindle inserted into each spindle chuck to align with opposing ends of an axle member during welding.

In another aspect of the present invention, the trailer axle manufacturing jig further comprises: a pair of removable dropped axle attachment arms coupled across the pair of jig horizontal members. Each of the removable dropped axle attachment arms have a pair of attachment brackets coupled to an underside of each dropped axle attachment arm for coupling the dropped axle attachment arm across the jig horizontal members, and a u-shaped axle retention bracket coupled to a topside of each dropped axle attachment arm about one end opposite from the attachment brackets.

In another aspect of the present invention, the trailer axle manufacturing jig further comprising a set of support cross members coupled to undersides of the jig horizontal members, one of the support cross members having a pair of mounting bolts for stowing the pair of removable dropped axle attachment arms when not in use.

In another aspect of the present invention, the pair of attachment bracket having a pair of opposing bracket arms perpendicular to a connecting surface coupled to the underside of the dropped axle attachment arm, each of the opposing bracket arms having a through hole for accepting the mounting bolts to stow the dropped axle attachment arms under the trailer axle manufacturing jig.

In another aspect of the present invention, the u-shaped axle retention bracket includes a u-shaped rod having a bottom end coupled to the dropped axle attachment arms and a pair of open ends creating an opening for accepting a dropped axle member, and a pair of support tubes that accept a pair of supporting bolts and corresponding nuts, the pair of support tubes being coupled to the u-shaped rod about its bottom end.

In another aspect of the present invention, the u-shaped axle retention bracket further comprises a set of bushings positioned on the pair of supporting bolts between the support tubes and heads of the supporting bolts and between the support tubes and corresponding nuts attached to the supporting bolts.

In another aspect of the present invention, each of the attachment wheel assemblies are adjustably coupled across the jig horizontal members by a wheel attachment strap.

In another aspect of the present invention, each attachment wheel assembly further comprising a hub having a plurality of lug bolts coupled to the spindle chuck, the hub couples to the attachment wheel using a set of lug nuts attached to each of the plurality of lug bolts.

In another aspect of the present invention, each of the leveling adjustment leg having a leveling adjustment handle for changing the length of the leveling adjustment legs to cause the support leg members and their corresponding corner of the trailer axle manufacturing jig to raise and lower permitting the jig horizontal members to be leveled.

In another aspect of the present invention, leveling the jig horizontal members aligns spindles inserted into the spindle chucks along a centerline of a trailer axle member for welding during assembly of a trailer axle assembly.

In another aspect of the present invention, the spindle chucks rotate about the centerline of a trailer axle member to permit welding of a weld seam during assembly of a trailer axle assembly.

In another aspect of the present invention, the trailer axle manufacturing jig is mounted within a towable trailer for transport to assembly locations of a trailer accepting a trailer axle assembly manufactured therein.

In another aspect of the present invention, the trailer axle manufacturing jig supports a trailer axle assembly allowing for leaf spring parts to be welded in alignment with correct placement of spindles in which both spindles match with a corresponding leaf spring.

In another aspect of the present invention, the jig horizontal members each include a pair of 2×2×⅛" square tubes stacked vertically.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout:

FIG. 17 illustrates front and rear views of a second attachment wheel coupled to the spindle chucks in the system providing an on-site trailer axle manufacturing jig according to the present invention.

DETAILED DESCRIPTION

Figure 1:
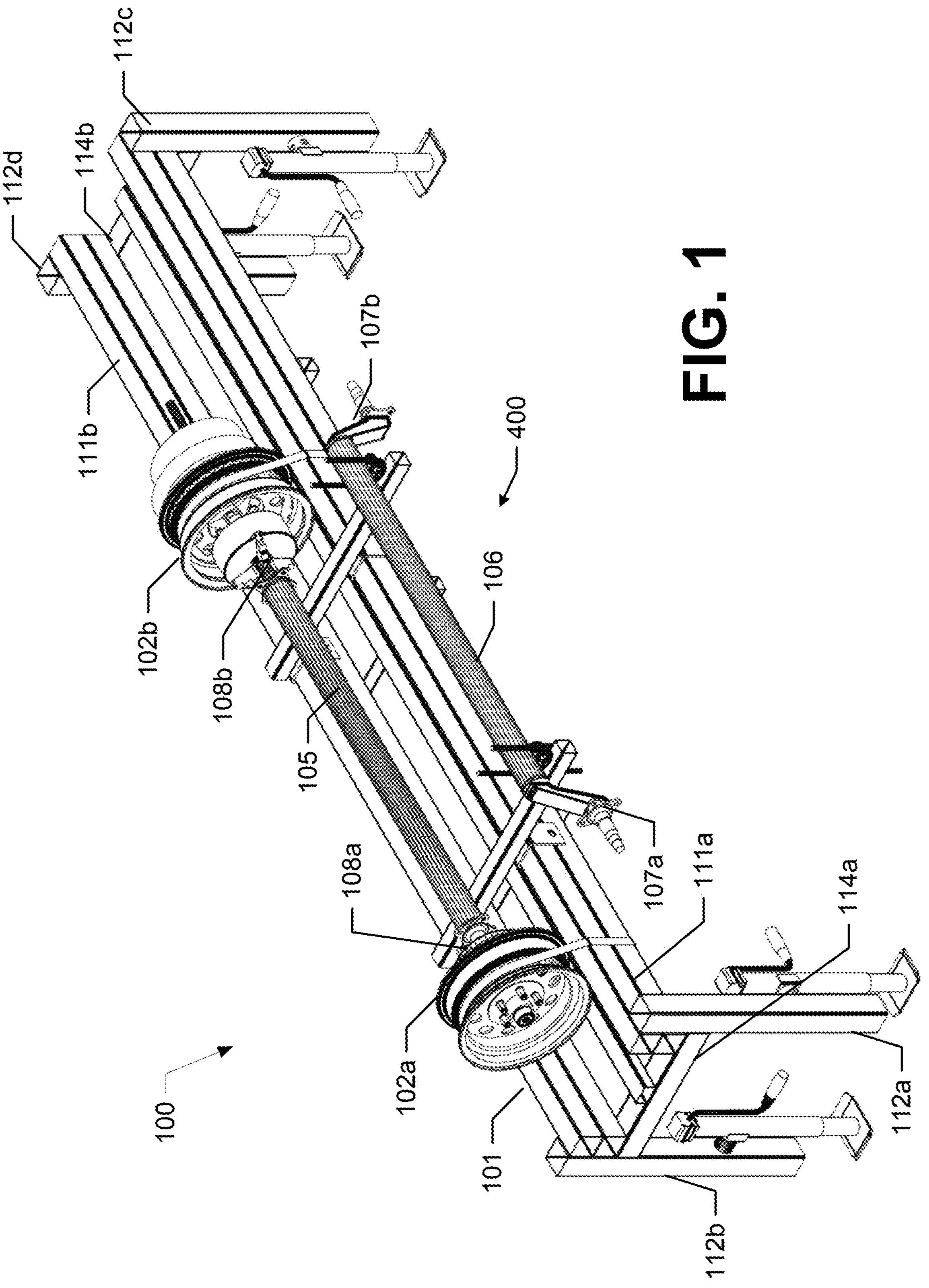
FIG. 1 illustrates an example embodiment of a system providing an on-site trailer axle manufacturing jig according to the present invention.

This application relates in general to a system providing trailer parts manufacturing, and more specifically, to a system providing an on-site trailer axle manufacturing jig according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using a system providing an on-site trailer axle manufacturing jig according to the present invention. The term user herein refers to one or more users.

The term "invention" or "a trailer axle manufacturing jig" refer to the present invention. Invention may be used interchangeably with a trailer axle jig.

In general, the present disclosure relates to a system providing an on-site trailer axle manufacturing jig according to the present invention. To better understand the present invention, FIG. 1 illustrates an example embodiment of a system providing an on-site trailer axle manufacturing jig according to the present invention. The example embodiment 100 of a trailer axle manufacturing jig 101 is shown with a dropped axle attachment 400 attached to the trailer axle jig. The trailer axle manufacturing jig 101 is typically installed within its own trailer (not shown) that enables the trailer axle manufacturing jig 101 to be taken to a location for installation into a trailer body (not shown).

The trailer axle manufacturing jig 101 is constructed using a pair of jig horizontal members 111*a-b* coupled to a pair of end cross members 114*a-b* at each end of the jig horizontal members 111*a-b*. A set of support cross members 201*a-c* are positioned along an underside of the jig horizontal members 111*a-b* to add structural support to the jig horizontal members 111*a-b* within the trailer axle manufacturing jig 101.

A set of support leg members 112*a-d* is vertically arranged to support the combination of the jig horizontal members 111*a-b* and end cross members 114*a-b*. Each of the support leg members 112*a-d* is coupled to a corresponding leveling adjustment legs 202*a-d* described in more detail in FIGS. 2-3 herein.

A pair of attachment wheels 102*a-b* is coupled to the jig horizontal members 111*a-b* using corresponding wheel attachment straps 203*a-b*. The attachment wheels 102*a-b* may be moved along the jig horizontal members 111*a-b* to create sufficient space for the trailer axle member 105 and a pair of spindles 108*a-b* to be coupled together into an axle assembly. The dropped axle attachment 400 may be removable and coupled to the jig horizontal members 111*a-b* of the trailer axle manufacturing jig 101 to permit a dropped axle assembly to be created using dropped axle member 106 and dropped axle spindle 109*a-b* assemblies.

The jig horizontal members 111*a-b* and the support leg members 112*a-d* may be constructed using 2×2×⅛" thick square steel tubing sufficient to support the weight of the trailer axle manufacturing jig 101 and any axle assembly manufactured thereon. In a preferred embodiment, each of the jig horizontal members 111*a-b* may include a pair of square steel tube members coupled on top of each other to decrease bending of the jig horizontal members 111*a-b* when loaded during manufacturing of the axle assemblies. The jig horizontal members 111*a-b* may possess a length sufficient to permit the attachment wheels 102*a-b* to be positioned apart to manufacture an axle assembly of a maximum length. The support leg members 112*a-d* may possess a length sufficient to position the jig horizontal members 111*a-b* at a desired height for a user to install and weld the components of an axle assembly during manufacturing. In a preferred embodiment, the jig horizontal members 111*a-b* have a length of 3 feet and the support leg members 112*a-d* have a length of 3 feet.

Figure 2:
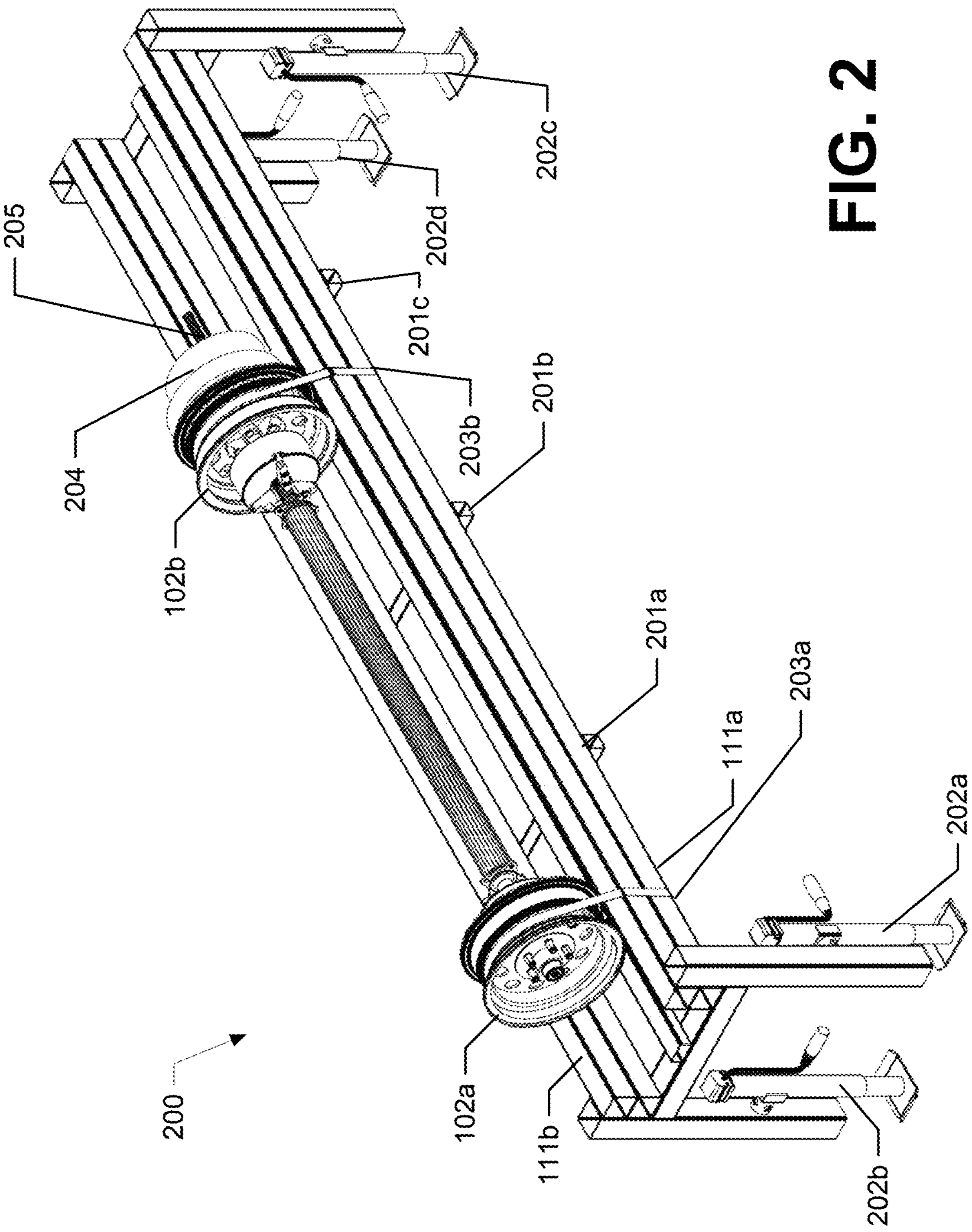
FIG. 2 illustrates another example embodiment of a system providing an on-site trailer axle manufacturing jig according to the present invention.

FIG. 2 illustrates another example embodiment of a system providing an on-site trailer axle manufacturing jig according to the present invention. The trailer axle manufacturing jig 101 is shown in FIG. 2 without the dropped axle attachment 400 coupled to the trailer axle manufacturing jig 101. The dropped axle attachment 400 is readily installed and removed from the trailer axle manufacturing jig 101 when a dropped axle assembly is to be fabricated.

The trailer axle manufacturing jig 101 is used by adjusting the height of the leveling adjustment legs 202*a-d* to configure the jig horizontal members 111*a-b* to be level when the trailer axle manufacturing jig 101 and its trailer are moved to various locations. The leveling of the jig horizontal members 111*a-b* configures the trailer axle manufacturing jig 101 to align the trailer axle member 105 and the spindles 108*a-b* along a level rotational axis when these components are welded together. The spindles 108*a-b* are inserted into the spindle chucks 103*a-b* of the attachment wheels 102*a-b* with their respective centers of rotation aligned permitting the trailer axle member 105 to be welded in between the spindles 108*a-b*. The spindle chucks 103*a-b* rotate about the centerline of the attachment wheels 102*a-b* providing a user access to a joint to be welded between the trailer axle member 105 and the spindles 108*a-b*. These welds may be created using a few tack weld points to hold these components in place with a final and complete weld to be made about the joint between the trailer axle member 105 and the spindles 108*a-b* by rotating the axle assembly while welding. Because the jig horizontal members 111*a-b* are leveled before the welding begins, the rotation of the axle assembly will occur about its centerline when welding. As such, the axle assembly, when completed will rotate about this centerline when ultimately attached to wheels and installed to a trailer frame.

A set of balancing weights 204 may be placed along an extending shaft 205 as a counterweight to the addition of the trailer axle member 105 and spindles 108*a-b* to the trailer axle manufacturing jig 101 during assembly. The balancing weights 204 may include a number of barbell weights totaling a desired amount of mass when placed onto the extending shaft 205.

Figure 3:
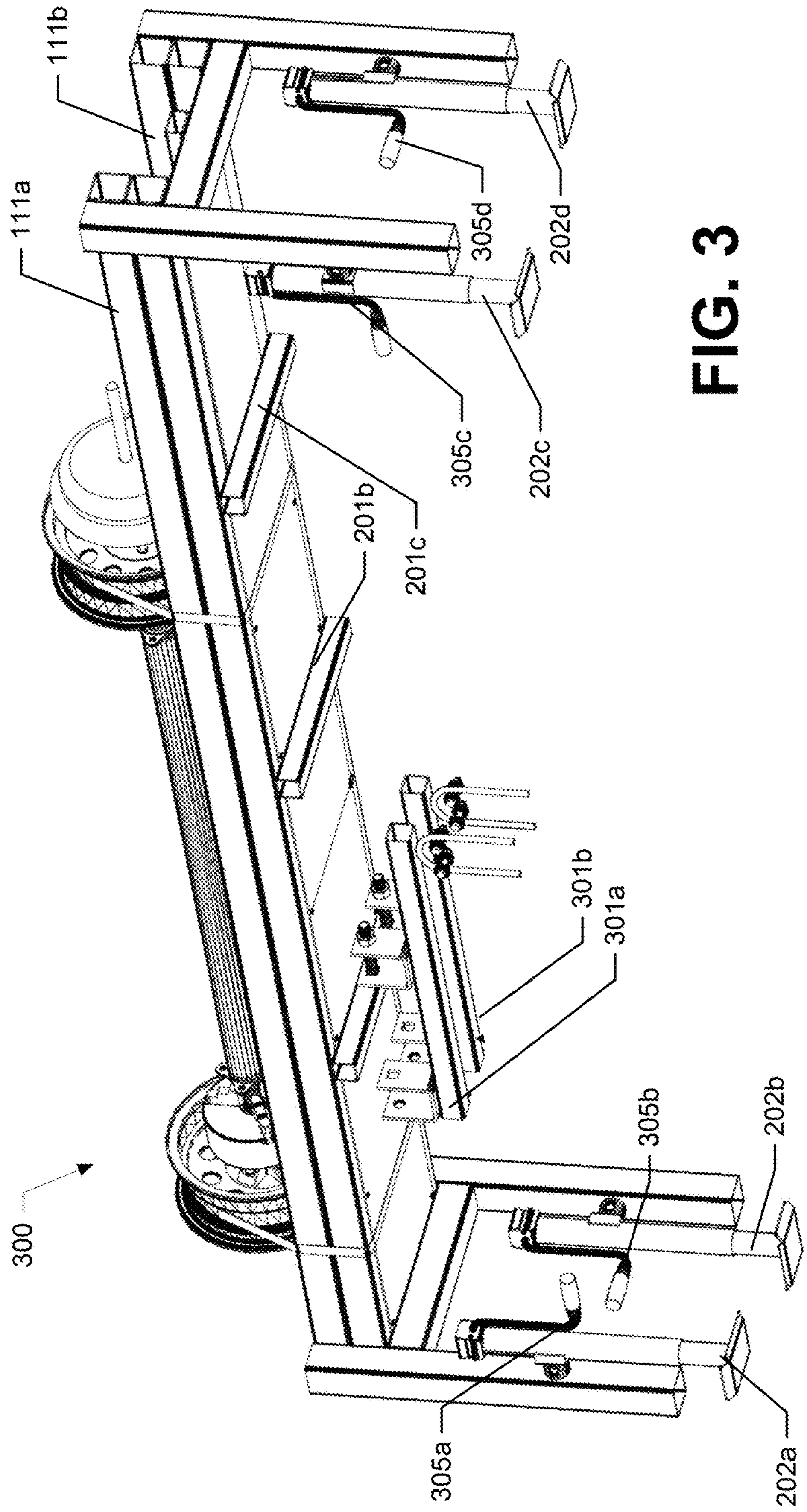
FIG. 3 illustrates an underside view of a system providing an on-site trailer axle manufacturing jig according to the present invention.

FIG. 3 illustrates an underside view of a system providing an on-site trailer axle manufacturing jig according to the present invention. An underside view 300 of the trailer axle manufacturing jig 101 shows the set of support cross members 201*a-c* coupled between the jig horizontal members 111*a-b* along its length. Each of the leveling adjustment legs 202*a-d* includes corresponding leveling adjustment handles 305*a-d* that adjust the position of the support leg members 112*a-d* in a vertical direction to level the jig horizontal members 111*a-b* of the trailer axle manufacturing jig 101. Rotation of the leveling adjustment handles 305*a-d* changes the length of the leveling adjustment legs 202*a-d*. The support leg members 112*a-d* are coupled to a top portion of the leveling adjustment legs 202*a-d* causing the support leg members 112*a-d* and their corresponding corner of the trailer axle manufacturing jig 101 to raise and lower permitting the jig horizontal members 111*a-b* to be leveled.

A pair of dropped axle attachment arms 301*a-b* is also shown stowed underneath the trailer axle manufacturing jig 101. A pair of attachment bracket 402*a-d* is coupled to an underside of each dropped axle attachment arm 301*a-b* used to couple the dropped axle attachment 400 to the jig horizontal members 111*a-b*. Each of the attachment brackets 402*a-d* possess an aligned pair of through holes that permit the dropped axle attachment arms 301*a-b* to be coupled to one of the support cross members 201*a-c* as described in detail with regards to FIGS. 9-10 herein.

The dropped axle attachment arms 301*a-b* may be constructed using 2×2×⅛" square steel tubing having a length sufficient to position a dropped axle assembly of the dropped axle member 106 at a level height to permit the dropped axle ends 107*a-b* to be welded to each end of the dropped axle member 106. The spindles 501*a-b* are initially tack welded to the dropped axle member 106 to be held in place while a weld can be made about the entire spindle 501*a-b* to the corresponding dropped axle attachment arms 301*a-b*. Each of the dropped axle attachment arms 301*a-b* may be positioned along the jig horizontal members 111*a-b* to support the dropped axle member 106 while being welded. The dropped axle member 106 and the dropped axle ends 107*a-b* may rotate as the final weld is made. The dropped axle attachment arms 301*a-b* are configured to be level with the top side of the jig horizontal members 111*a-b* causing the dropped axle member 106 to be level when placed into the dropped axle attachment arms 301*a-b* when the jig horizontal members 111*a-b* have been leveled as disclosed herein.

Figure 4:
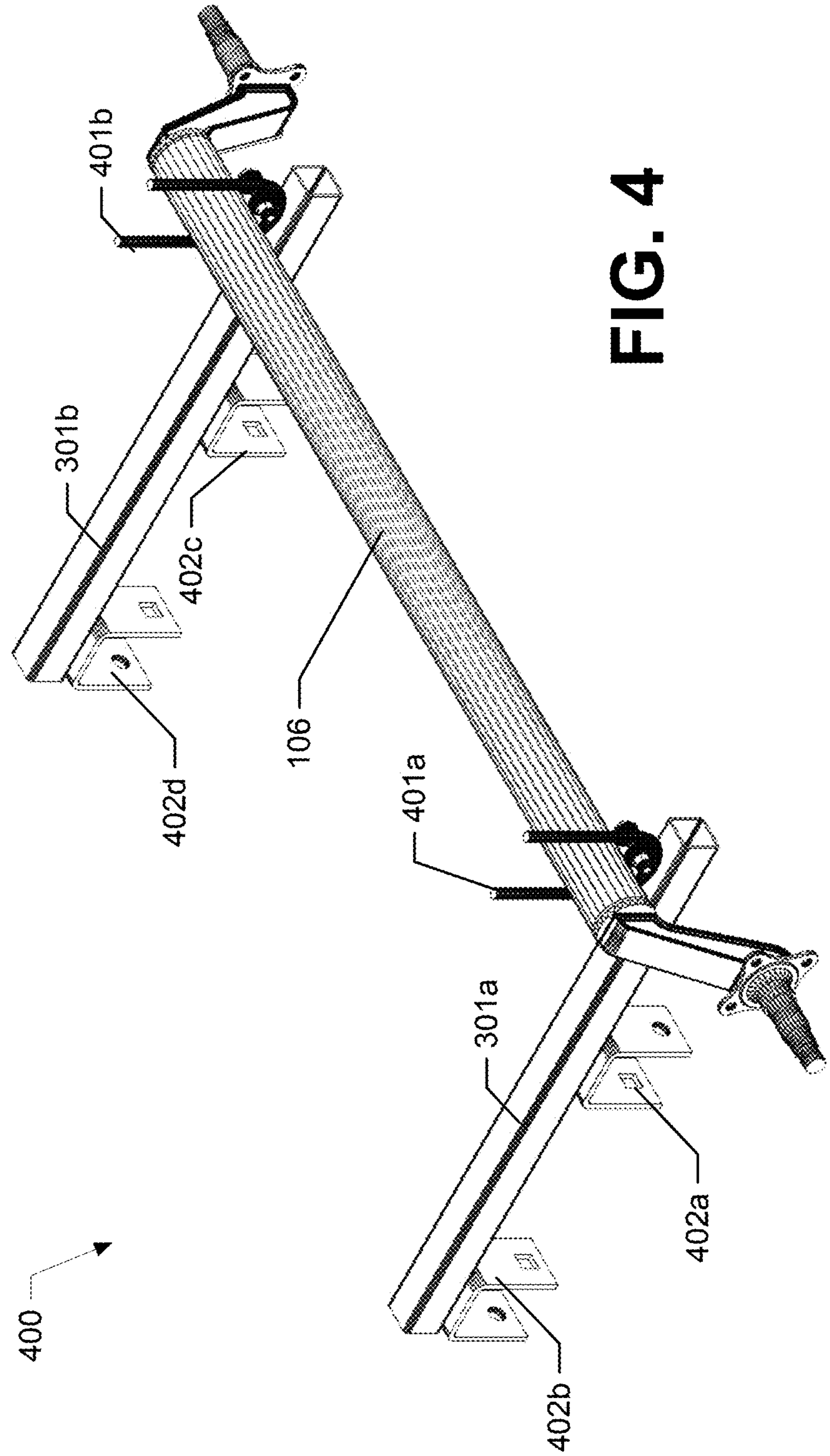
FIG. 4 illustrates an example dropped axle attachment to a system providing an on-site trailer axle manufacturing jig according to the present invention.

FIG. 4 illustrates an example dropped axle attachment to a system providing an on-site trailer axle manufacturing jig according to the present invention. The dropped axle attachment 400 is shown with a dropped axle assembly having its dropped axle member 106 placed within u-shaped axle retention brackets 401*a-b* configured on an outer end of each of the dropped axle attachment arms 301*a-b*. A pair of dropped axle ends 107*a-b* is shown having been welded to each end of the dropped axle member 106.

The dropped axle attachment arms 301*a-b* are each constructed to include the u-shaped axle retention bracket 401 on an upper side about the outer end of the dropped axle attachment arms 301*a-b*. A pair of attachment brackets 402*a-d* is positioned about an inner end of each of the dropped axle attachment arms 301*a-b* on an underside of the dropped axle attachment arms 301*a-b*. Each of the attachment bracket 402*a-d* is a u-shaped bracket configured to attach to the jig horizontal members 111*a-b* of the trailer axle manufacturing jig 101. The pair of attachment brackets 402*a-d* on each of the dropped axle attachment arms 301*a-b* is separated by the spacing of the jig horizontal members 111*a-b* from each other along the sides of the trailer axle manufacturing jig 101.

Each of the attachment brackets 402*a-d* couples onto both of the jig horizontal members 111*a-b* when the dropped axle attachment 400 is installed onto the trailer axle manufacturing jig 101 as shown in FIG. 1. The pair of dropped axle attachment arms 301*a-b* may be positioned along the jig horizontal members 111*a-b* at a distance sufficient to support a dropped axle member 106 when being manufactured. When the dropped axle assembly has been completed, the dropped axle attachment arms 301*a-b* may be removed from the trailer axle manufacturing jig 101 and stowed underneath the trailer axle manufacturing jig 101 as shown in FIG. 3.

Figure 5:
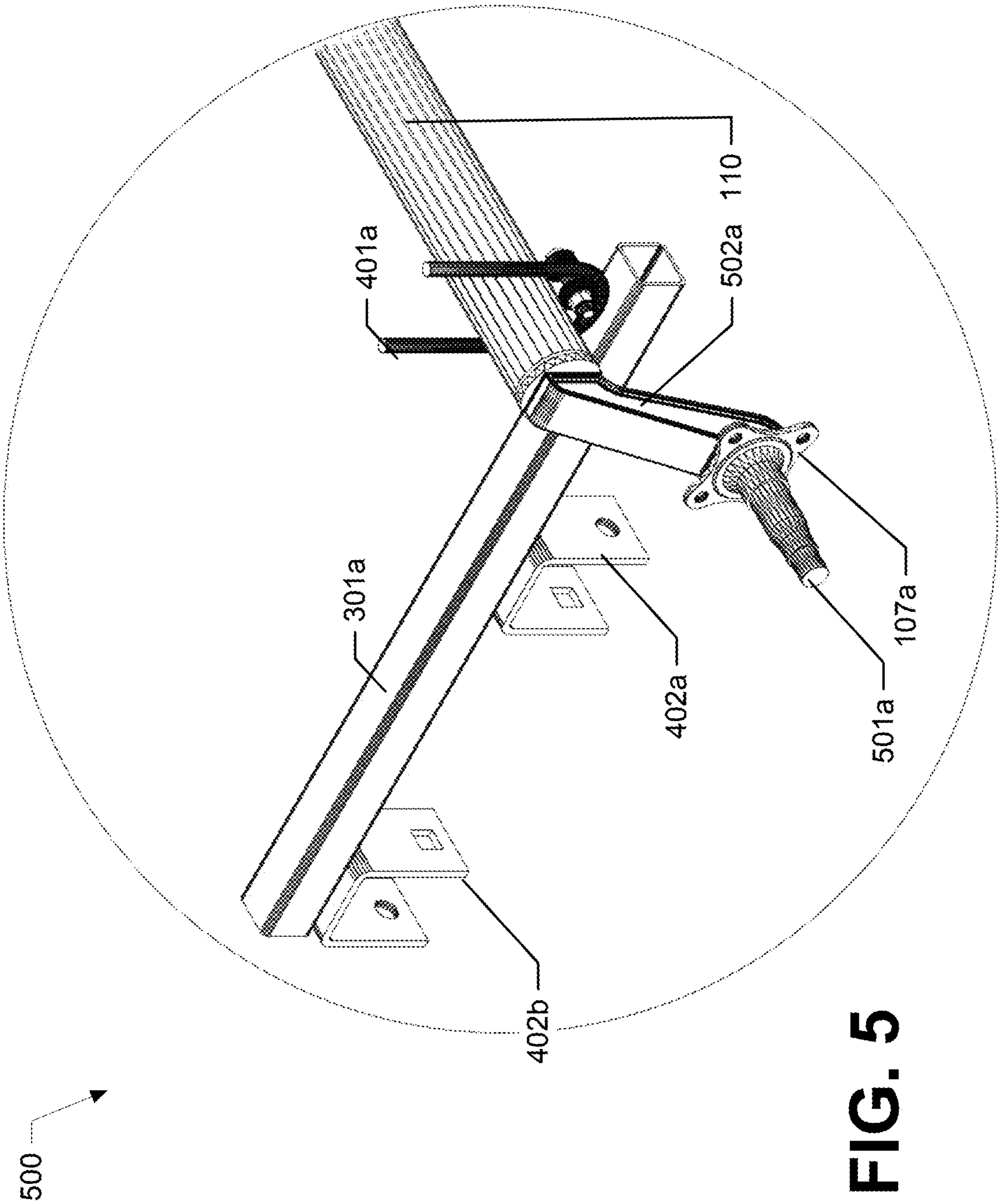
FIG. 5 illustrates a close-up view of one end of a dropped axle within a system providing an on-site trailer axle manufacturing jig according to the present invention.
Figure 6:
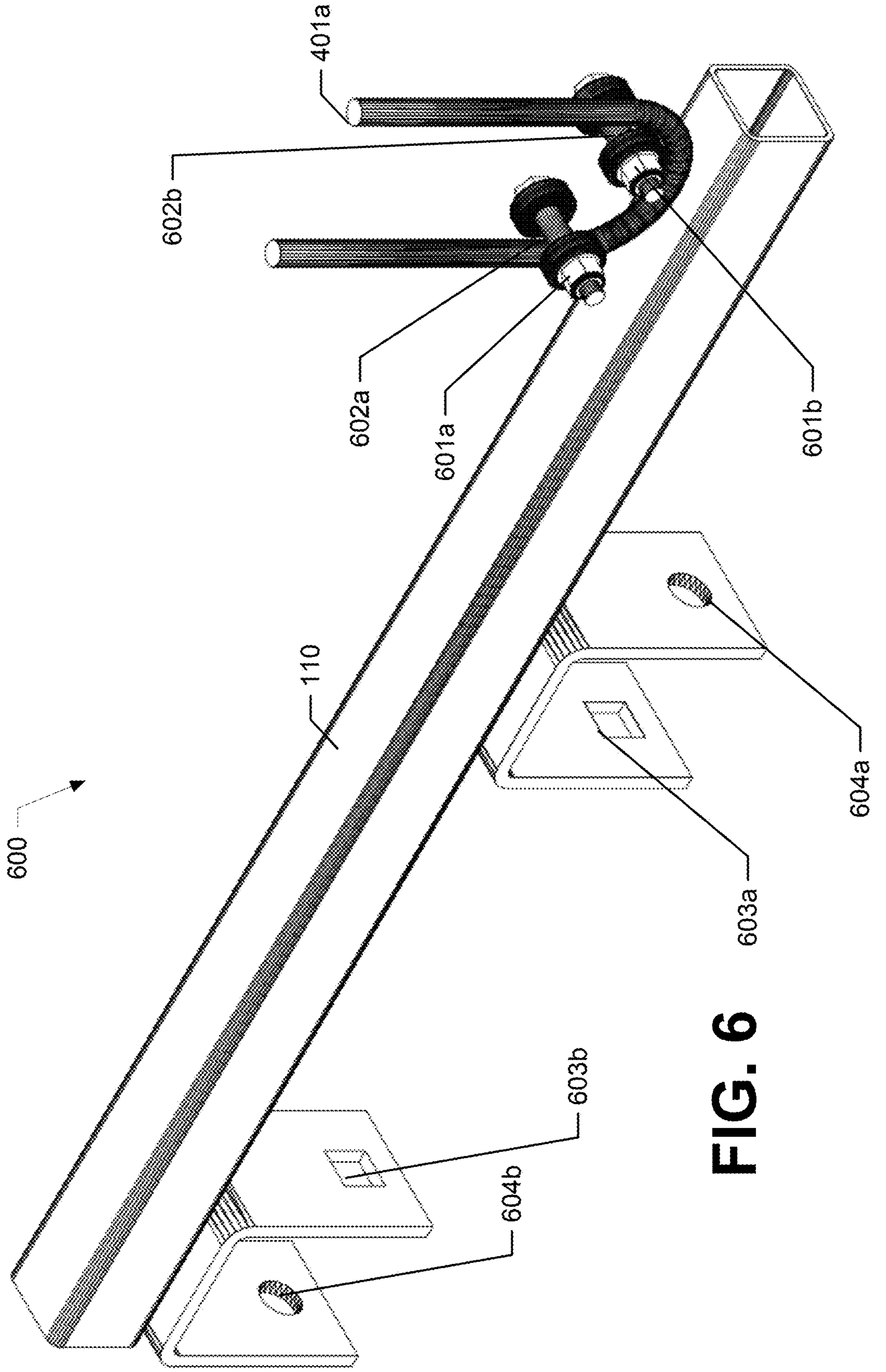
FIG. 6 illustrates an extension arm of a dropped axle attachment of a system providing an on-site trailer axle manufacturing jig according to the present invention.

FIG. 5 illustrates a close-up view of one end of a dropped axle within a system providing an on-site trailer axle manufacturing jig according to the present invention. A close-up view 500 shown in FIG. 5 illustrates the dropped axle end 107*a-b* including a spindle 501*a* and a dropped axle angle bracket 502*a* coupled to one end of the dropped axle member 106. The dropped axle member 106 is shown within the u-shaped axle retention bracket 401 resting upon a pair of supporting bolts 602*a-b* and corresponding nuts 601*a-b* positioned about an inner end of the u-shaped axle retention bracket 401 as shown in detail in FIG. 6.

The pair of attachment brackets 402*a-b* is shown coupled to the underside of the dropped axle attachment arms 301*a-b* at an inner end and about a middle portion of the dropped axle attachment arms 301*a-b*. The u-shaped axle retention bracket 401*a* is shown on the top side of the dropped axle attachment arms 301*a-b* at the outer end opposite of the attachment bracket 402*b*. Each of the attachment brackets 402*a-b* is shown to include a square through hole 603*a-n* in one side the u-shaped attachment bracket 402*a-d* and a round through hole 604*a-b* in the opposing side of the u-shaped attachment bracket 402*a-b*. The through holes 603*a-b* and 604*a-b* are configured to engage mounting bolts of the support cross members 201*a-c* as shown in FIGS. 2 and 9-10 herein.

Figure 7:
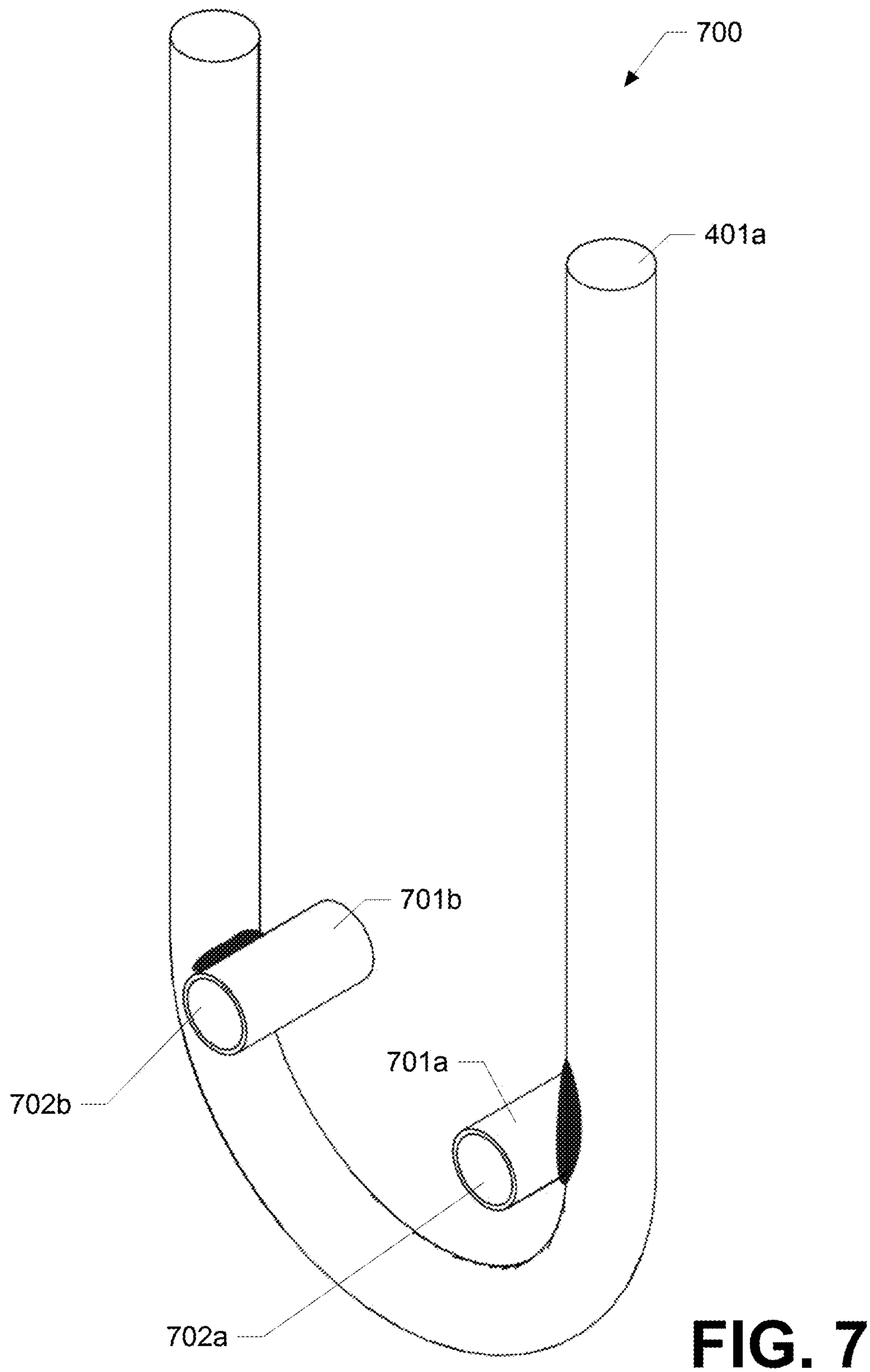
FIG. 7 illustrates a u-shaped support of the extension arm used in the system providing an on-site trailer axle manufacturing jig according to the present invention.
Figure 8:
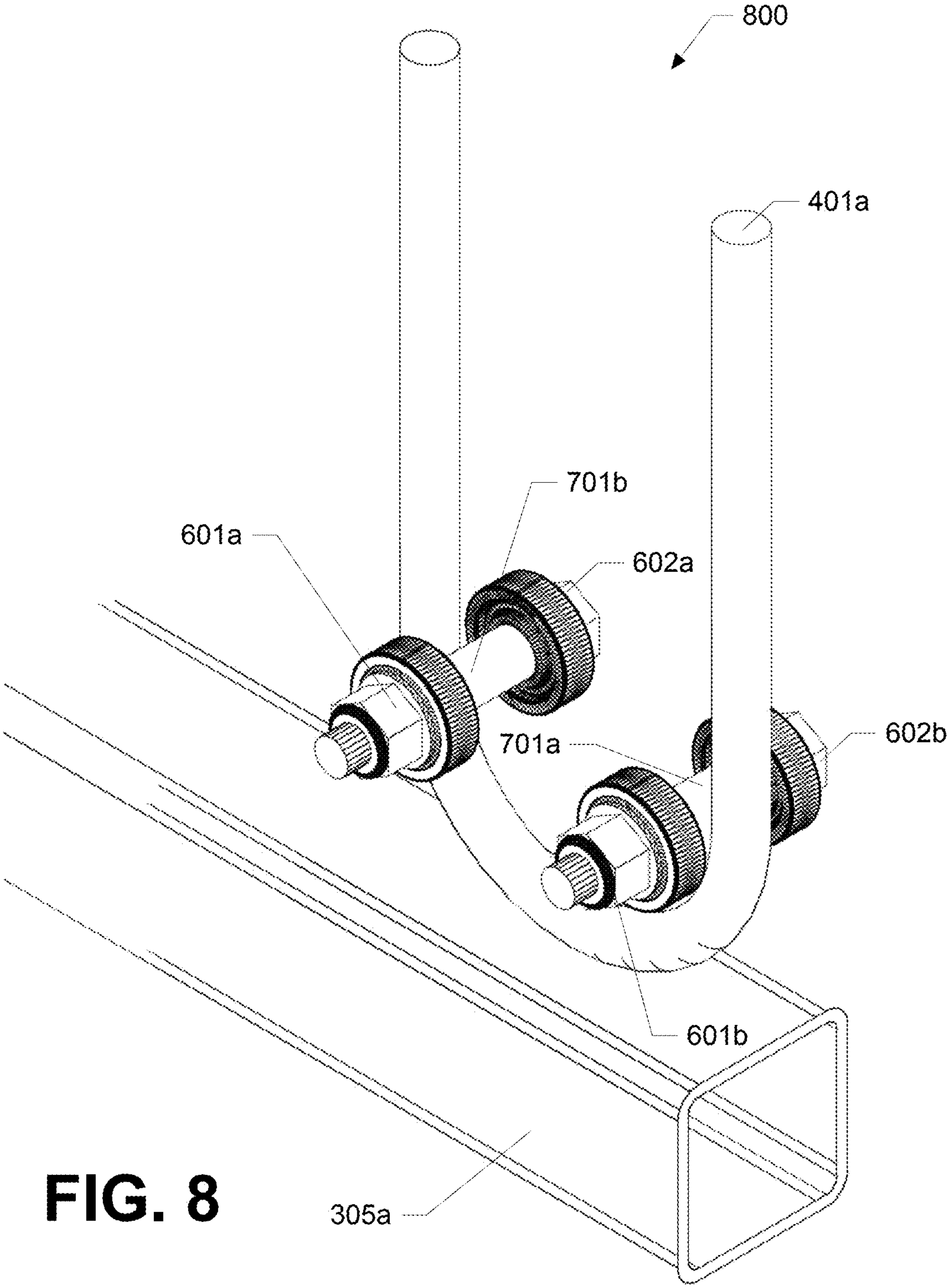
FIG. 8 illustrates installation of support bolts with the u-shaped support of the extension arm used in a system providing an on-site trailer axle manufacturing jig according to the present invention.

FIG. 7 illustrates a u-shaped support of the extension arm used in the system providing an on-site trailer axle manufacturing jig according to the present invention. The U-shaped axle retention bracket 401*a* is shown in FIG. 7 having a pair of support tubes 701*a-b* that accept the pair of supporting bolts 602*a-b* and corresponding nuts 601*a-b* shown installed in FIG. 8. In the embodiment of FIG. 8, separate washers or bushings 711*a-b* are positioned between the bolt head 602*a-b* and one end of the support tubes 701*a-b* and another pair 711*c-d* at the opposite end between the support tube 701*a-b* and the corresponding nuts 601*a-b*. In alternate embodiments, the bolt head 602*a-b* and nuts 601*a-b* may provide sufficient support for the axle member when placed therein. The pair of supporting bolts 602*a-b* and corresponding nuts 601*a-b*, or bushings 711*a-d* provides supporting surfaces onto which the dropped axle member 106 rests when in the u-shaped axle retention brackets 401*a-b*.

Figure 9:
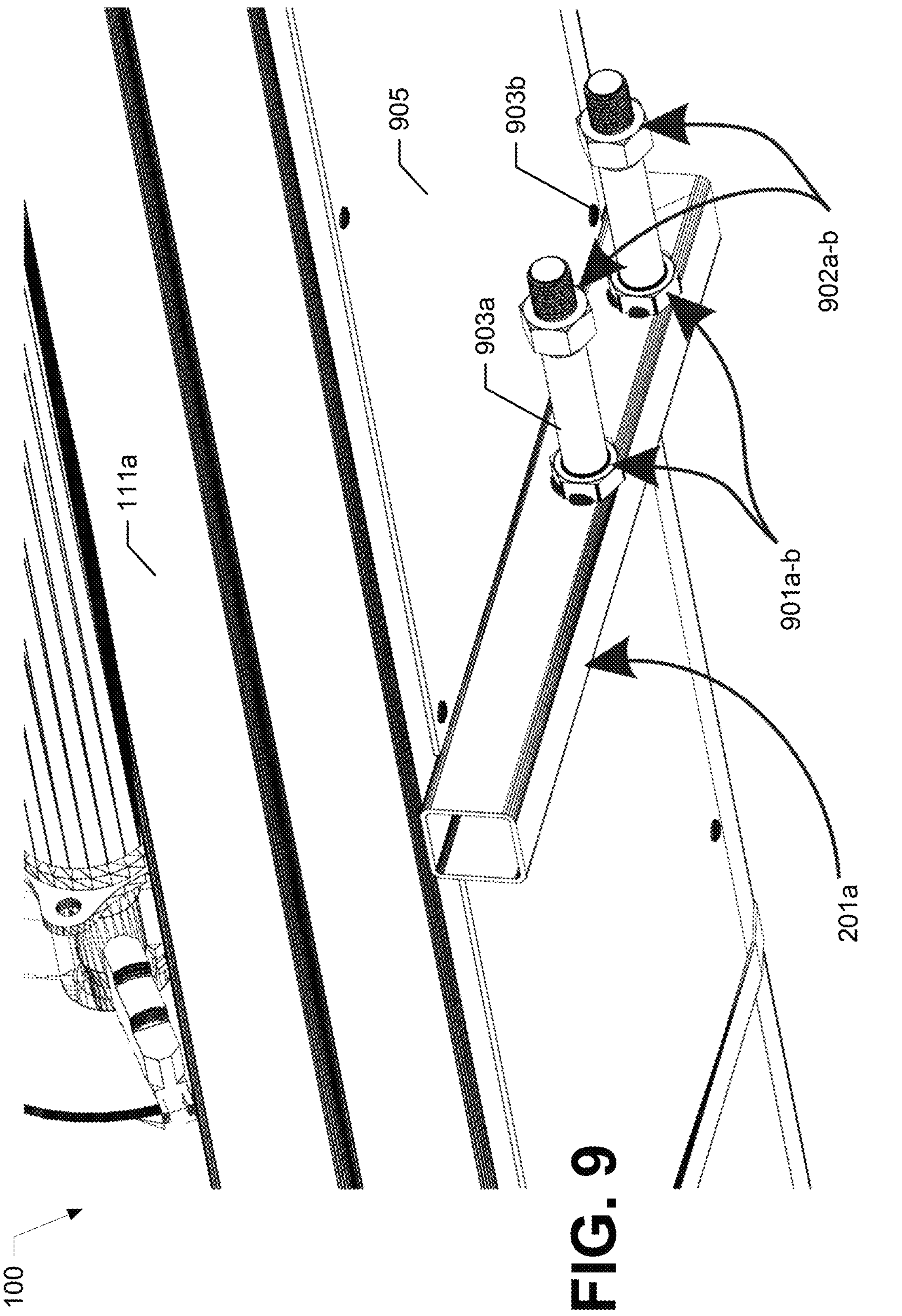
FIG. 9 illustrates an example embodiment of attachment arm mounts on an underside of the system providing an on-site trailer axle manufacturing jig according to the present invention.
Figure 10:
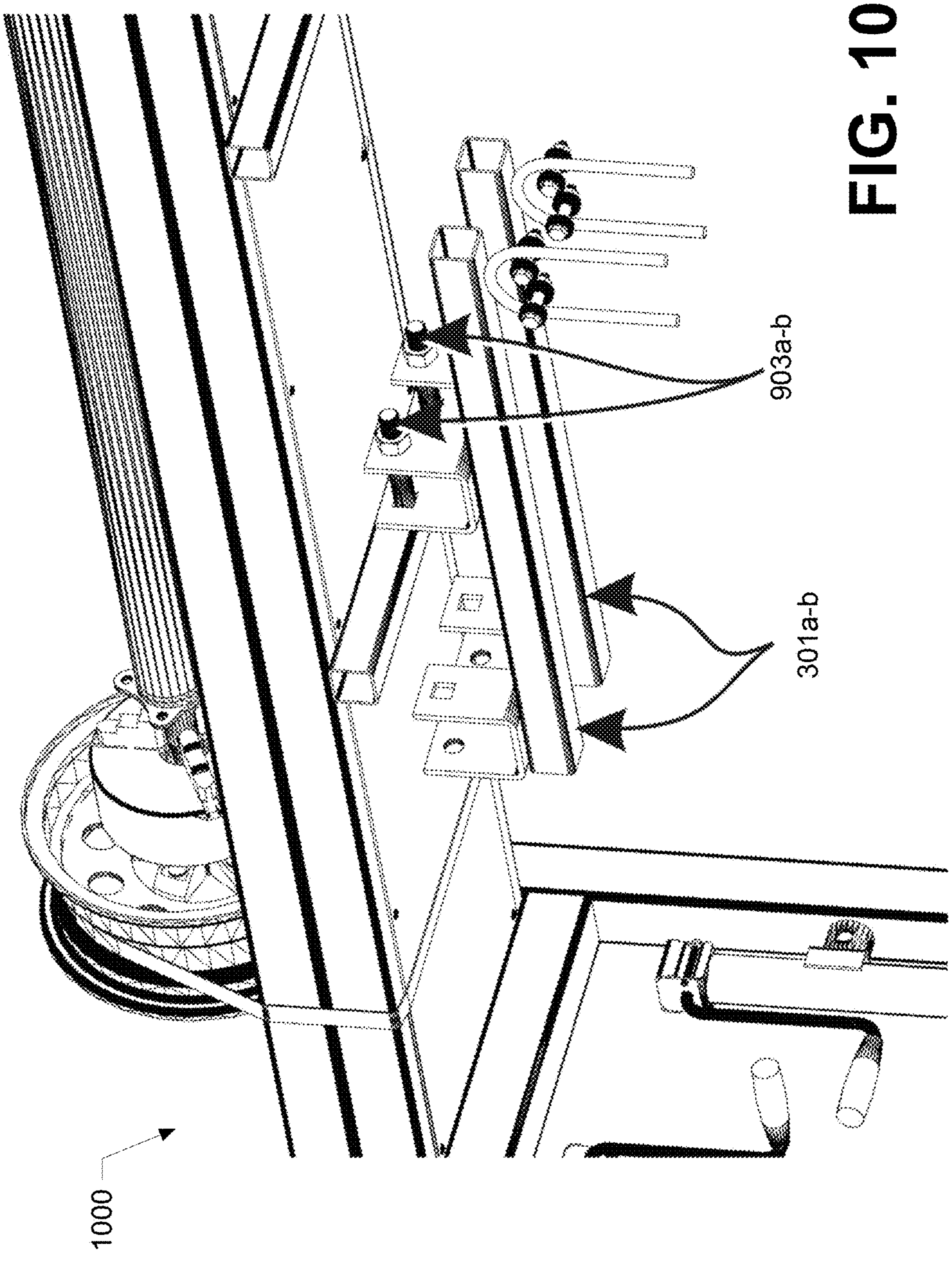
FIG. 10 illustrates attachment arms mounted onto the underside of the system providing an on-site trailer axle manufacturing jig according to the present invention.

FIG. 9 illustrates an example embodiment of attachment arm mounts on an underside of the system providing an on-site trailer axle manufacturing jig according to the present invention. A pair of mounting bolts 903*a-b* is shown coupled to one of the support cross members 201*a-c*. The mounting bolts 903*a-b* may be inserted through a pair of through holes (not shown) and secured to the support cross member 201*a* by a pair of inner securing nuts 901*a-b*. A pair of outer securing nuts 902*a-b* is attached to the outer ends of the mounting bolts 903*a-b* as shown in FIG. 10.

To mount the dropped axle attachment arms 301*a-b* to the trailer axle manufacturing jig 101, the mounting bolts 903*a-b* are inserted through the corresponding through holes 603*a-b* and 604*a-b* until one side of each of the attachment brackets 402*a-d* rests against the inner securing nuts 901*a-b*. The outer securing nuts 902*a-b* are next attached to the mounting bolts 903*a-b* and tightened until the outer securing bolts 902*a-b* are against another side of the attachment bracket 402*a-d* securing the dropped axle attachment arms 301*a-b* to the trailer axle manufacturing jig 101. The outer securing nuts 902*a-b* may be removed when a mounted pair of dropped axle attachment arms 301*a-b* is to be used.

Figure 11:
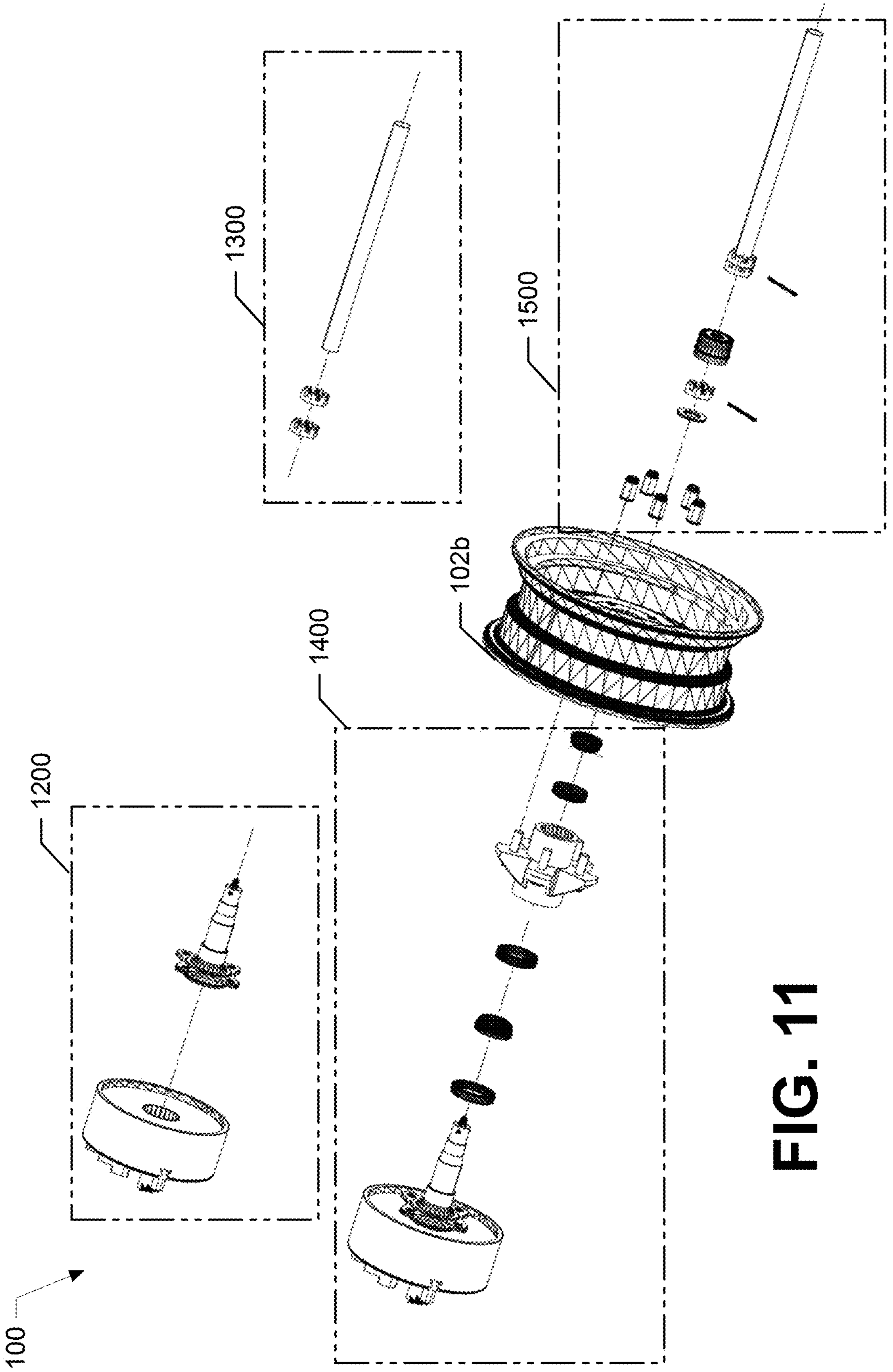
FIG. 11 illustrates an exploded view of a weighted attachment wheel for supporting one end of a trailer axle for manufacture in the system providing an on-site trailer axle manufacturing jig according to the present invention.

FIG. 11 illustrates an exploded view of a weighted attachment wheel 102*b* for supporting one end of a trailer axle for manufacture in the system providing an on-site trailer axle manufacturing jig according to the present invention. A similar attachment wheel 102*a* contains all of the components shown in FIGS. 11 and 13-15 as the attachment wheel 102*a* does not include the extending shaft 205. The exploded view 1100 of the attachment wheels 102*a-b* includes a chuck assembly 1200 shown in detail in FIG. 12, a weight support arm assembly 1300 shown in detail in FIG. 13, a spindle and hub assembly 1400 shown in detail in FIG. 14, and the wheel rim attachment assembly 1500 shown in detail in FIG. 15. Each assembly is disclosed below.

Figure 12:
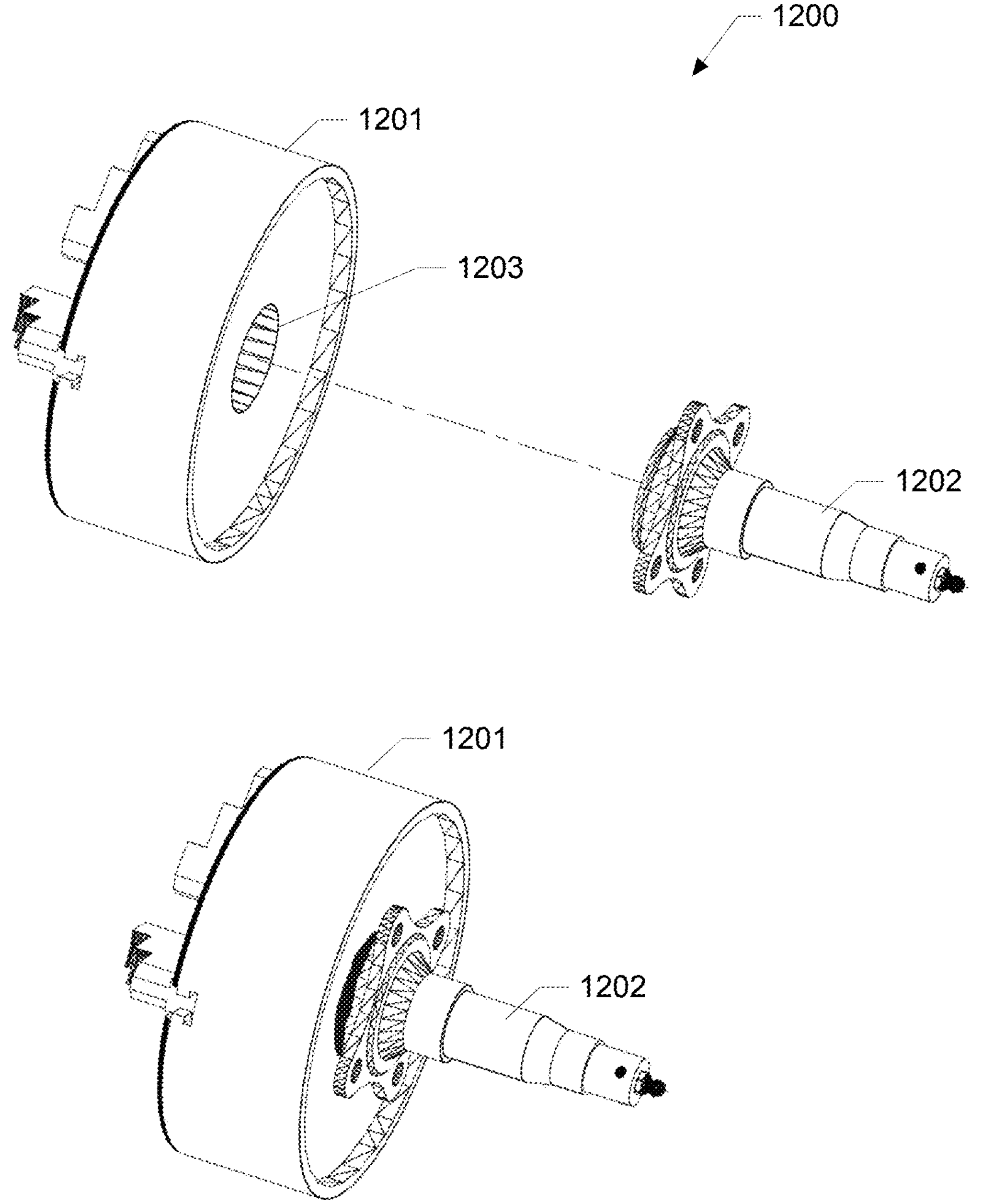
FIG. 12 illustrates an exploded view of a spindle coupled to spindle chucks within the weighted attachment wheel of the system providing an on-site trailer axle manufacturing jig according to the present invention.

FIG. 12 illustrates an exploded view of a spindle coupled to spindle chucks within the weighted attachment wheel of the system providing an on-site trailer axle manufacturing jig according to the present invention. A spindle chuck 1201 is coupled to a wheel mount spindle 1202 about a spindle through hole 1203 in the spindle chuck 1201. The spindle through hole 1203 permits a spindle 106*a-b* to pass through the spindle chuck 1201 when held in place for welding to a trailer axle member 105. The wheel mount spindle 1202 mounts the spindle chuck 1201 to the attachment wheel 102*a* while permitting the spindle chuck 1201 to rotate when the attachment wheel 102*a-b* is secured to the jig horizontal members 111*a-b* using the wheel attachment strap 203*a-b*.

Figure 13:
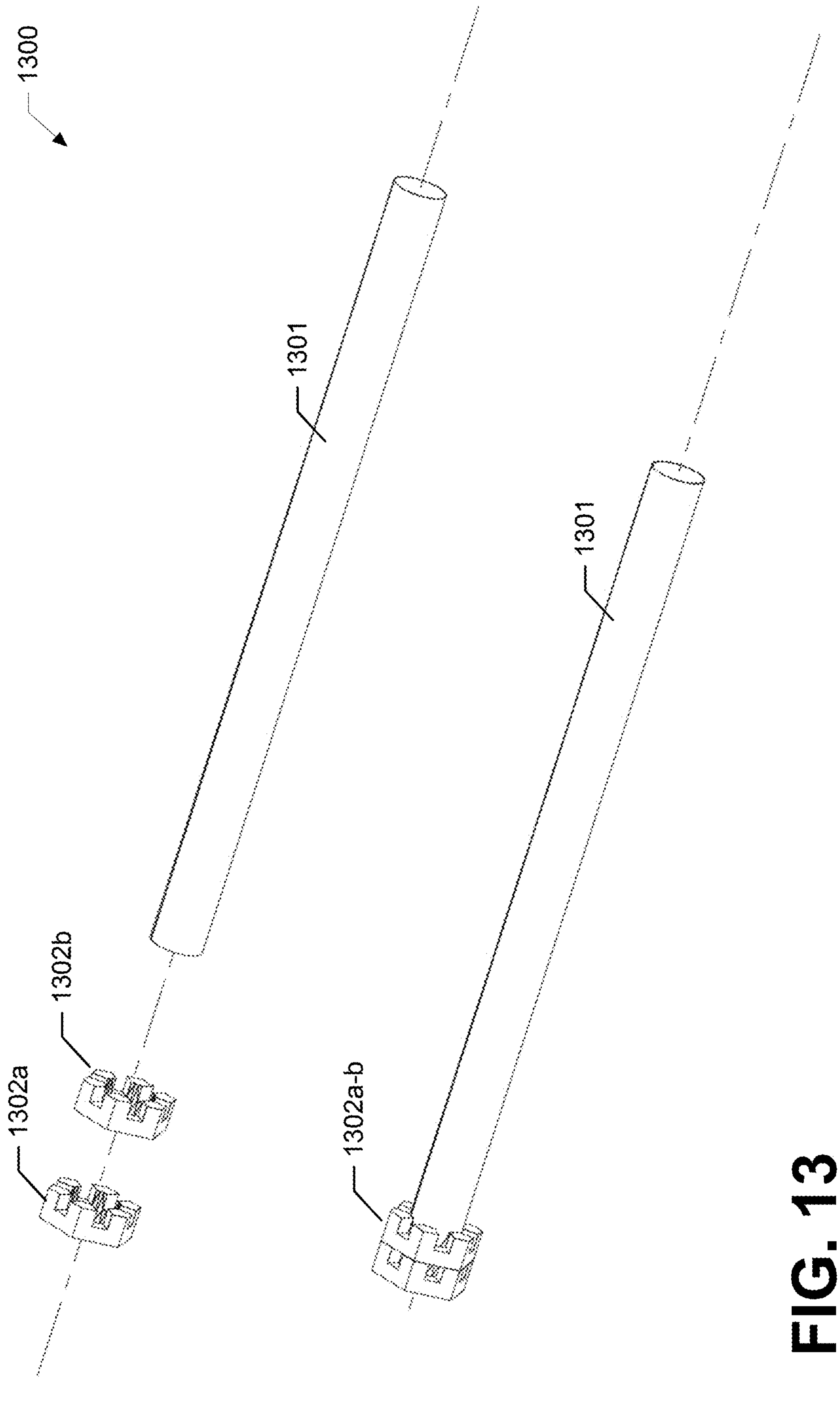
FIG. 13 illustrates an exploded view of a weight support arm used in the weighted attachment wheel of the system providing an on-site trailer axle manufacturing jig according to the present invention.

FIG. 13 illustrates an exploded view of a weight support arm used in the weighted attachment wheel of the system providing an on-site trailer axle manufacturing jig according to the present invention. The weight support arm assembly 1300 includes an extending shaft 205 having a pair of collar nuts 1302*a-b* coupled to one end. The collar nuts 1302*a-b* are used to couple the extending shaft 205 to the spindle 1201. The balancing weights 204 may be added to the extending shaft 205 to introduce a balancing force onto the spindle 1201 when an axle assembly is being manufactured when the spindles 108*a-b* are inserted into the opposite side of the chucks 1201.

Figure 14:
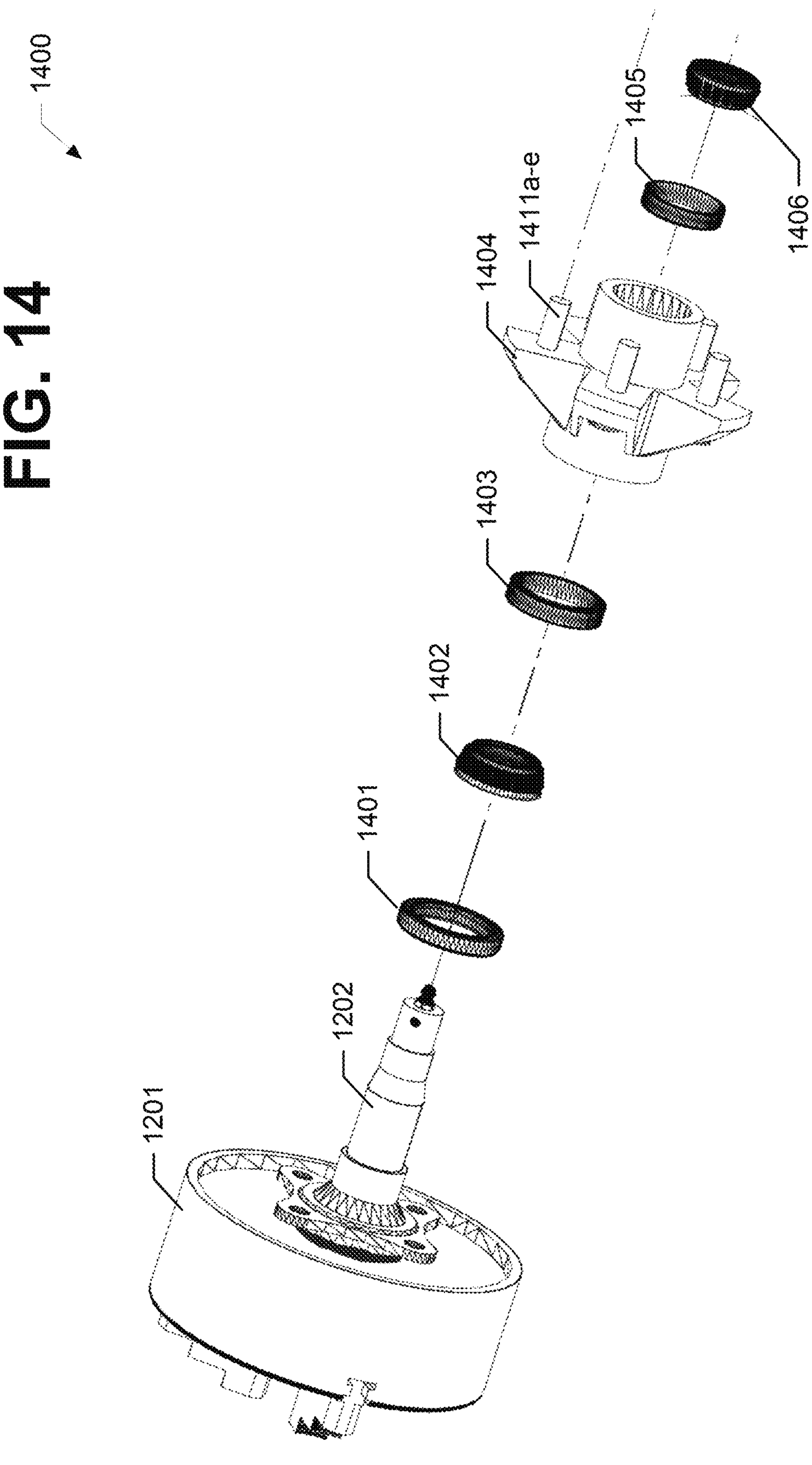
FIG. 14 illustrates an exploded view of the spindle chucks with a wheel hub that is part of the weighted attachment wheel of the system providing an on-site trailer axle manufacturing jig according to the present invention.

FIG. 14 illustrates an exploded view of the spindle chucks with a wheel hub that is part of the weighted attachment wheel of the system providing an on-site trailer axle manufacturing jig according to the present invention. The spindle chuck assembly 1200 has a set of seal and bearing components 1401-1403 placed onto the spindle 1201 that passes through a wheel hub 1404 that couples the assemblies to the attachment wheel 102*a-b*. A portion of the spindle passes through the wheel hub 1404 and attachment wheel 102*a* to engage the weight support arm assembly 1300 as shown in FIG. 15.

Figure 15:
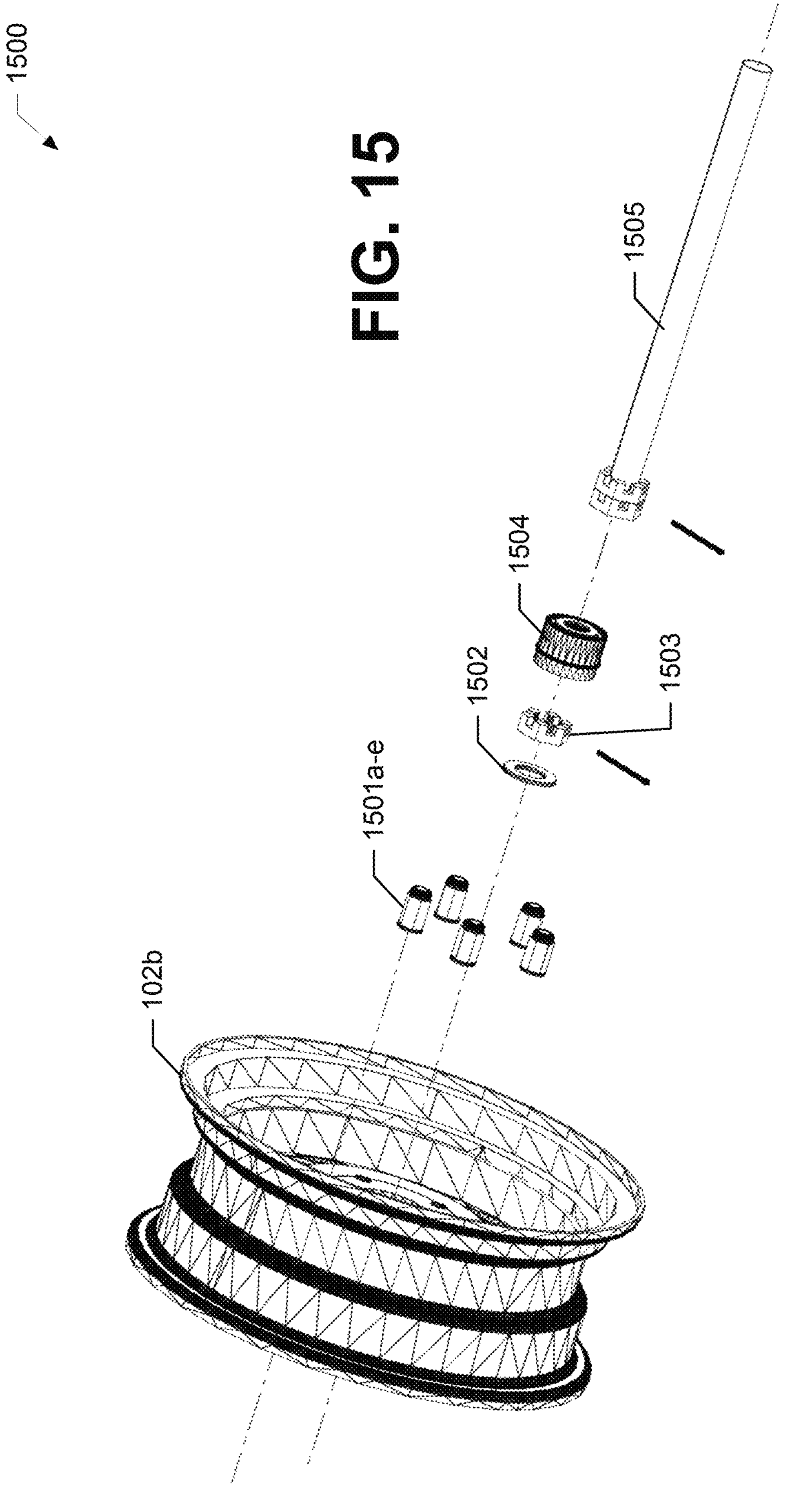
FIG. 15 illustrates an exploded view of hub coupling components of the weighted attachment wheel in the system providing an on-site trailer axle manufacturing jig according to the present invention.

FIG. 15 illustrates an exploded view of hub coupling components of the weighted attachment wheel in the system providing an on-site trailer axle manufacturing jig according to the present invention. A washer 1502 and a collar nut 1503 couple to the spindle 1201 that passes through the wheel hub 1404 and attachment wheel 102*a* to couple the weight support arm assembly 1300 to the spindle 1201 and wheel hub 1404. The wheel hub 1404 includes a set of lug bolts 1411*a-e* that extends through the attachment wheel 102*a* to be held in place using a corresponding set of jug nuts 1501*a-e*. The example embodiment shown in FIGS. 11-15 utilizes a standard 5-lug pattern that corresponds to the mounting holes of the attachment wheel 102. Other lug patterns may be utilized with the number and arrangement of the lug bolts 1411*a-e* matching the number of corresponding mounting holes of the attachment wheel 102. A matching number of lug nuts 1501*a-e* is used to secure the attachment wheel 102*a* to the spindle assembly 1200.

When the attachment wheel 102*a* is secured to the jig horizontal members 111*a-b* of the trailer axle manufacturing jig 101 using the wheel attachment straps 203*a-b*, the attachment wheel 102*a-b* remains stationary in place with an axis of rotation of the spindle 1201 parallel to the jig horizontal members 111*a-b*. The opposite attachment wheel 102*b* is likewise configured aligning the axis of its spindle in line with the opposing spindle. As such, a pair of spindles 108*a-b* is aligned with this axis of rotation of the spindle chucks 103*a-b*. When a trailer axle member 105 is welded to the spindles 108*a-b*, the trailer axle member 105 aligns with this axis of rotation as the axle assembly is being fabricated.

The sequence of steps to utilize the trailer axle manufacturing jig 101 begins with a monitoring user leveling the trailer axle manufacturing jig 101 using the leveling adjustment handles 305*a-d* that adjust the position of the support leg members 112*a-d* and the leveling adjustment leg 202*a-d*. A monitoring user moves the attachment wheels 102*a-b* to proper spacing along the horizontal members 111*a-b* to accept the axle member 105 and spindles 106*a-b* during manufacture. Balancing weights 204 may be added to the 205 as needed before a pair of spindles 108*a-b* are inserted into spindle chucks 103*a-b*. 5. The trailer axle member 105 is tack welded to spindles 108*a-b* before the chucks 103*a-b* are rotated while a seam between spindle 108*a-b* and trailer axle member 105 is welded. Use of the trailer axle manufacturing jig 101 allows for proper beam alignment between the spindles 108*a-b* being welded to trailer axle member 105 and for allowing for leaf spring parts to be welded in alignment with correct placement of spindles 108*a-n* in which both match with a corresponding leaf spring. Use of the trailer axle manufacturing jig 101 also ensures the axle spindles 108*a-b* are both straight with axle beam 105.

Figure 16:
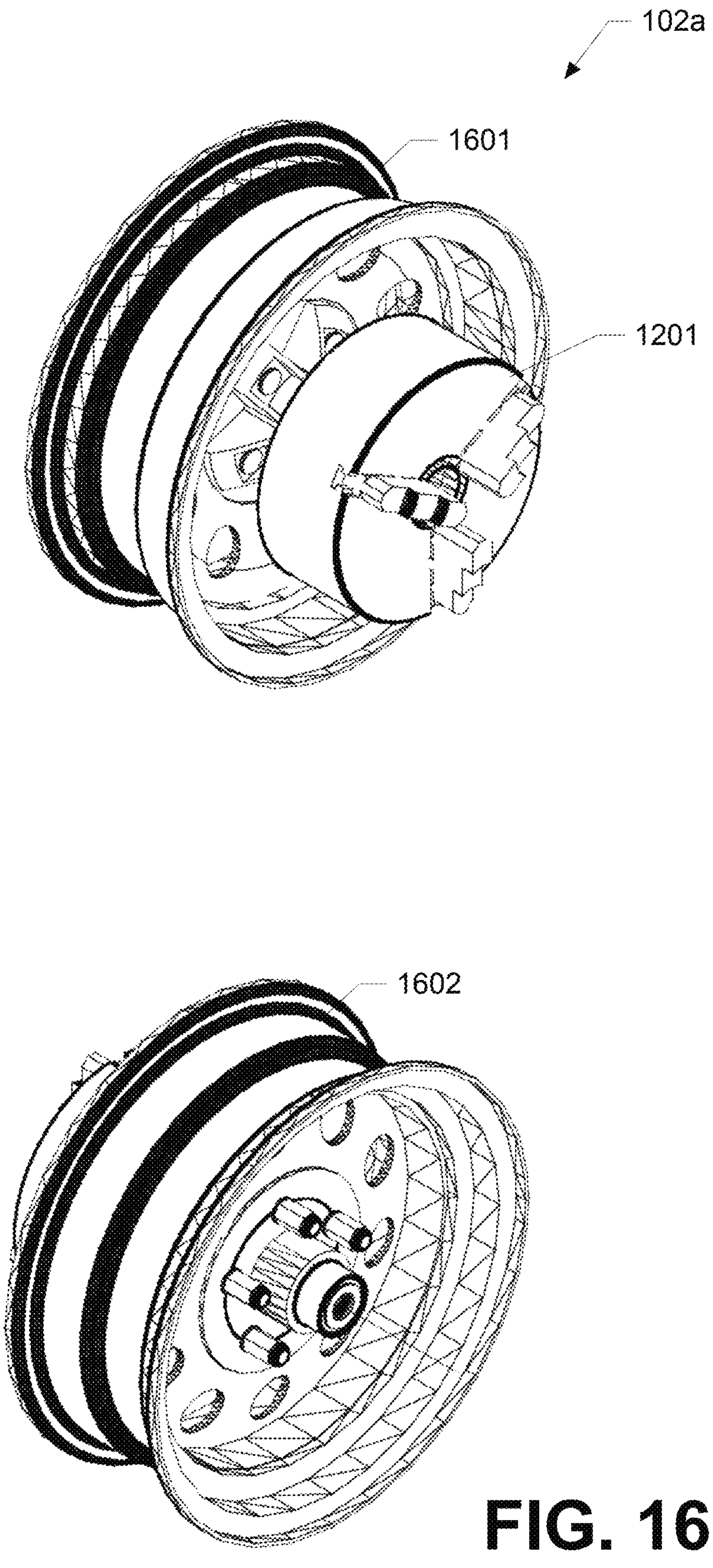
FIG. 16 illustrates front and rear views of a first attachment wheel coupled to the spindle chucks in the system providing an on-site trailer axle manufacturing jig according to the present invention.

FIG. 16 illustrates front and rear views of a first attachment wheel coupled to the spindle chucks 1603*a-b* in the system providing an on-site trailer axle manufacturing jig according to the present invention. An axle fabrication side view 1601 and a mounting side view 1602 of the completed assembly are shown. The moving jaws 1603 of the chuck are visible allowing a spindle to be inserted into the chuck for mounting. A chuck key is inserted into chuck hole to rotate causing the jaws to open and close securely about the spindles.

The mounting side view 1602 shows the lug nuts 1501*a-e* restraining the wheel 102*a* against the chuck and hub assembly. The embodiment of FIG. 16 shows an attachment wheel 102*a* that does not include the weight support arm assembly 1200 that is used for one side of the axle assembly when being fabricated. The opposing attachment wheel 102*b* includes the weight support arm assembly 1200 to accept counter balancing weights 204 as needed.

FIG. 17 illustrates front and rear views of a second attachment wheel coupled to the spindle chucks 1703*a-b* in the system providing an on-site trailer axle manufacturing jig according to the present invention. An axle fabrication side view 1701 and a mounting side view 1702 of the completed assembly are shown. The moving jaws 1703 of the chuck are visible allowing a spindle to be inserted into the chuck for mounting The mounting side view 1702 shows the lug nuts 1501*a-e* restraining the wheel 102*b* against the chuck and hub assembly. The embodiment of FIG. 17 shows an attachment wheel 102*b* that includes the weight support arm assembly 1200 that is used for one side of the axle assembly when being fabricated. The attachment wheel 102*b* includes the weight support arm assembly 1200 to accept counter balancing weights 204 as needed.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A trailer axle manufacturing jig for manufacturing a trailer axle, the trailer axle manufacturing jig comprising:

a pair of jig horizontal members;

a pair of end cross members coupled between the pair of jig horizontal members about opposing ends;

a set of support leg members vertically arranged to support the combination of the jig horizontal members and the end cross members, each of the support leg members is coupled to a corresponding leveling adjustment leg;

a pair of attachment wheel assemblies adjustable coupled between the jig horizontal members, each attachment wheel assembly having an attachment wheel, a spindle chuck, and a wheel mount spindle; and an extending shaft coupled to one of the attachment wheel assemblies for receiving a set of balancing weights to act as a counterweight when manufacturing the trailer axle;

wherein the trailer axle is assembled with a spindle inserted into each spindle chuck to align with opposing ends of an axle member during welding.

2. The trailer axle manufacturing jig according to claim 1, wherein the trailer axle manufacturing jig further comprises: a pair of removable dropped axle attachment arms coupled across the pair of jig horizontal members, each of the removable dropped axle attachment arms comprising:

a pair of attachment brackets coupled to an underside of each dropped axle attachment arm for coupling the dropped axle attachment arm across the jig horizontal members; and a u-shaped axle retention bracket coupled to a bottom side of each dropped axle attachment arm about one end opposite from the attachment brackets.

3. The trailer axle manufacturing jig according to claim 2, wherein the trailer axle manufacturing jig further comprising a set of support cross members coupled to undersides of the jig horizontal members, one of the support cross members having a pair of mounting bolts for stowing the pair of removable dropped axle attachment arms when not in use.

4. The trailer axle manufacturing jig according to claim 3, wherein the pair of attachment bracket having a pair of opposing bracket arms perpendicular to a connecting surface coupled to the underside of the dropped axle attachment arm, each of the opposing bracket arms having a through hole for accepting the mounting bolts to stow the dropped axle attachment arms under the trailer axle manufacturing jig.

5. The trailer axle manufacturing jig according to claim 2, wherein the u-shaped axle retention bracket comprises:

a u-shaped rod having a bottom end coupled to the dropped axle attachment arms and a pair of open ends creating an opening for accepting a dropped axle member; and a pair of support tubes that accept a pair of supporting bolts and corresponding nuts, the pair of support tubes being coupled to the u-shaped rod about its bottom end.

6. The trailer axle manufacturing jig according to claim 5, wherein the u-shaped axle retention bracket further comprises a set of bushings positioned on the pair of supporting bolts between the support tubes and heads of the supporting bolts and between the support tubes and corresponding nuts attached to the supporting bolts.

7. The trailer axle manufacturing jig according to claim 1, wherein each of the attachment wheel assemblies are adjustably coupled across the jig horizontal members by a wheel attachment strap.

8. The trailer axle manufacturing jig according to claim 7, wherein each attachment wheel assembly further comprising a hub having a plurality of lug bolts coupled to the spindle chuck, the hub couples to the attachment wheel using a set of lug nuts attached to each of the plurality of lug bolts.

9. The trailer axle manufacturing jig according to claim 1, wherein each of the leveling adjustment leg having a leveling adjustment handle for changing the length of the leveling adjustment legs to cause the support leg members and a corresponding corner of the support leg member of the trailer axle manufacturing jig to raise and lower permitting the jig horizontal members to be leveled.

10. The trailer axle manufacturing jig according to claim 9, wherein leveling the jig horizontal members aligns spindles inserted into the spindle chucks along a centerline of the axle member for welding during assembly of a trailer axle assembly.

11. The trailer axle manufacturing jig according to claim 10, wherein the spindle chucks rotate about the centerline of the axle member to permit welding of a weld seam during assembly of the trailer axle assembly.

12. The trailer axle manufacturing jig according to claim 1, wherein the trailer axle manufacturing jig supports the trailer axle allowing for leaf spring parts to be welded in alignment with correct placement of spindles in which both spindles match with a corresponding leaf spring.

13. The trailer axle manufacturing jig according to claim 1, wherein the jig horizontal members each include a pair of 2×2×⅛" square tubes stacked vertically.

* * * * *